Patented Feb. 11, 1947

2,415,775

UNITED STATES PATENT OFFICE 2,415,775

CRYSTALLIZING COATING COMPOSITION

William Allshire Waldie, Oakwood, Ohio, assignor to Chemical Developments Corporation, Dayton, Ohio, a corporation of Ohio No Drawing. Application March 1, 1945, Serial No. 580,497

10 Claims. (Cl. 260—735)

This invention relates to a composition for producing coatings having a crystalline pattern. The coating composition is adapted for decorating metal, glass, wood, paper and the like, in particular non-absorbent hard surfaces, so as to provide them with a pleasing durable finish having a crystalline surface pattern.

One of the principal objects of this invention is to make a coating composition which can be applied by spraying, flowing or dipping and which will dry to a tough very hard, wear resistant film which has a substantially uniform crystalline-like surface.

Another object is to provide a coating composition which can be used as a one-coat finish for articles.

Another object is to provide an air drying, or forced air drying, coating composition which can be applied as a varnish, paint or enamel to produce a crystalline finish.

Still another object of the invention is to provide a coating composition of excellent adhesive power to the material to be coated.

These and other objects and advantages will become apparent from the following description.

I have discovered that a crystallizing coating composition of the above described properties can be made by "cold cutting" a solution of acetanilide in organic solvent and chlorinated rubber.

As typical example of my invention and without restricting the same thereto, the following formulations are given:

Example I

| | | |
|---|---|---|
| Chlorinated rubber | pounds | 56 |
| Acetanilide | do | 32 |
| Hydrogenated naphtha | gallons | 26 |
| Acetone | do | 6 |
| Methyl ethyl ketone | do | 16 |

The ingredients are mixed by "cold cutting" whereupon the composition is ready for application onto the surface to be coated. This may be done by immersion, flowing or spraying. Upon air-drying of a film produced from the mixture of this example a finish is obtained which is characterized by a smooth surface and a fine-textured crystal formation giving the appearance of a nice and uniform pattern.

Example II

| | | |
|---|---|---|
| Chlorinated rubber | pounds | 56 |
| Acetanilide | do | 32 |
| Hydrogenated naphtha | gallons | 30 |
| Acetone | do | 2 |
| Butanol | do | 8 |
| Ethanol | do | 8 |
| Toluol | do | 16 |

The coating composition was prepared as described in Example I. A film produced from this composition showed a considerably larger crystal formation than that made with the composition of Example I. However, all the other properties were about the same in both cases.

Example III

| | | |
|---|---|---|
| Chlorinated rubber | pounds | 56 |
| Acetanilide | do | 32 |
| Hydrogenated naphtha | gallons | 28 |
| Ethanol | do | 12 |
| Xylol | do | 8 |
| Cellosolve (ethylene glycol monethyl ether) | gallons | 4 |
| Ethyl acetate | do | 20 |
| Amyl alcohol | do | 5 |

A coating produced from this composition showed excellent crystal formation and very good properties.

Sometimes and for some purposes the coatings obtained according to the above given examples are too hard. In such cases plasticizers known in the art, such as tricresyl phosphate, triphenyl phosphate, dibutyl phthalate may be added.

It is also within the scope of this invention to modify the compositions given above by the addition of oils, e. g. linseed oil, soya bean oil, Perilla oil and tung oil. By this, coatings with crystalline patterns of different character may be obtained.

If desired, natural or synthetic resins that are compatible with the mixture, such as copal resins, resin ester, phenolic resins, alkyd resins or maleic acid resins, may be added to the compound of my invention. It was found that by the addition of some of these resins, a coating was obtained that had the crystalline appearance typical for the compounds of this invention and in addition showed wrinkle finish texture.

When it is desired to have a pigmented or colored crystalline coating, this may be effected by adding pigment dispersed in the film forming constituent similarly as in the making of paints, enamels and the like. The pigment may also be admixed to the finished coating composition or to any of the other components.

When desired, hydrocarbon soluble dye, such as aniline or the like, may be employed with or without pigment particles. In this instance, a sufficient amount of the dye is dissolved in the ethyl alcohol and incorporated with the film forming and crystallizing ingredients.

My crystallizing coating composition exhibits excellent hiding power without the presence of pigment, dye or the like, due to the light ray defraction effected by the crystals in the dried film.

In the foregoing examples, the crystallizing lacquer is formed by "cold cutting" the constituents, and the composition is applied and air-dried, or force air dried, similarly as in the case of nitrocellulose, ethyl cellulose and the like cellulose lacquer composition.

In place of acetanilide as the crystallizing substance, there may be used other organic or inorganic crystallizing substances which can be dissolved in the solvent and will crystallize out upon evaporation of the solvent. I prefer to use acetanilide, though because of its ready solubility in the low cost denatured alcohol solvent and also because it has very little odor.

As examples of other crystallizing substances, materials such as salicylic acid, phthalic acid, saliformin, and the like may be used. The crystalline substance selected should be one which is readily dissolved in the ordinary low boiling commercial solvents and one which will not react with the other constituents to form a noncrystallizing compound.

It will be understood that while there have been described certain embodiments of this invention, it is not intended thereby to have it limited to or circumscribed by the specific details of procedure, materials, proportions and conditions set forth, since this invention may be modified according to individual preference and conditions without departing from the spirit of this disclosure and the scope of the appended claims.

I claim:

1. A coating composition comprising a crystallizing solution consisting of substantially 32 pounds of a crystallizing substance selected from the group consisting of acetanilide, phthalic acid, salicylic acid and saliformin dissolved in 48 to 77 gallons of solvent and substantially 56 pounds of chlorinated rubber.

2. A coating composition comprising a solution consisting of substantially 32 pounds of acetanilide dissolved in 48 to 77 gallons of solvent and of substantially 56 pounds of chlorinated rubber.

3. A coating composition comprising a solution consisting of substantially 32 pounds of acetanilide dissolved in 48 to 77 gallons of solvent, of substantially 56 pounds of chlorinated rubber and a plasticizer.

4. A coating composition comprising a solution consisting of substantially 32 pounds of acetanilide dissolved in 48 to 77 gallons of solvent and of substantially 56 pounds of chlorinated rubber, and oil.

5. A coating composition comprising a solution consisting of substantially 32 pounds of acetanilide dissolved in 48 to 77 gallons of solvent, substantially 56 pounds of chlorinated rubber and resin.

6. A coating composition comprising a solution consisting of substantially 32 pounds of acetanilide dissolved in 48 to 77 gallons of solvent, substantially 56 pounds of chlorinated rubber and coloring material.

7. A coating composition consisting of 56 pounds of chlorinated rubber, 32 pounds of acetanilide, 26 gallons of hydrogenated naphtha, 6 gallons of acetone and 16 gallons of methyl ethyl ketone.

8. A coating composition consisting of 56 pounds of chlorinated rubber, 32 pounds of acetanilide, 30 gallons of hydrogenated naphtha, 2 gallons of acetone, 8 gallons of butanol, 8 gallons of ethanol and 16 gallons of toluol.

9. A coating composition consisting of 56 pounds of chlorinated rubber, 32 pounds of acetanilide, 28 gallons of hydrogenated naphtha, 12 gallons of ethanol, 8 gallons of xylol, 4 gallons of ethylene of glycolmonethyl ether, 20 gallons of ethyl acetate and 5 gallons of amyl alcohol.

10. An article coated with a film having a crystalline-like pattern, such film being derived from the composition as set forth in claim 1.

WILLIAM ALLSHIRE WALDIE.

REFERENCES CITED

The following references are of record in the file of this patent:

UNITED STATES PATENTS

| Number | Name | Date |
|---|---|---|
| 1,844,479 | Pearl | Feb. 9, 1932 |
| 2,142,193 | Janz | Jan. 3, 1939 |
| 2,317,380 | Higgins | Apr. 27, 1943 |
| 2,319,886 | Sandstrom | May 25, 1943 |
| 2,344,191 | Waldie | Mar. 14, 1944 |